United States Patent
Stadler et al.

[11] 3,755,328
[45] Aug. 28, 1973

[54] PROCESS FOR PREPARING ERGOT ALKALOIDS

[75] Inventors: Paul Stadler, Biel-Benken Baselland; Albert Hofmann, Bottmingen, both of Switzerland

[73] Assignee: Sandoz Ltd., (A/K/A Sandoz AG), Basel, Switzerland

[22] Filed: July 19, 1972

[21] Appl. No.: 273,114

Related U.S. Application Data
[63] Continuation-in-part of Ser. No. 27,156, April 9, 1970, abandoned.

[30] Foreign Application Priority Data
Apr. 18, 1969  Switzerland.......................... 5895/69
Sept. 2, 1969  Switzerland....................... 13262/69

[52] U.S. Cl.... 260/268 PE, 260/268 TR, 260/285.5
[51] Int. Cl............................................. C07d 43/20
[58] Field of Search ............................. 260/268 PE

[56] References Cited
UNITED STATES PATENTS
3,227,719  1/1966  Hofmann..................... 260/268 TR
3,428,639  2/1969  Stadler.......................... 260/268 PE
3,666,762  5/1972  Guttmann..................... 260/268 PE OTHER PUBLICATIONS
Stadler et al., Helv. Chim. Acta., Vol. 52, p. 1549–1564 (1969).

Primary Examiner—Donald G. Daus
Attorney—Gerald D. Sharkin, Thomas O. McGovern et al.

[57] ABSTRACT
The invention concerns a novel process for the production of a compound of the formula:

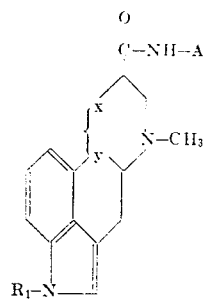

in which $\overline{x\ y}$ is the group

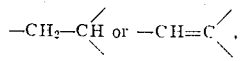

and
$R_1$ is hydrogen, lower alkyl, allyl or benzyl and
—NH—A is a cyclic polypeptide of the type known in ergot peptide alkaloids. lysergic acid halides, obtained by reaction with thionyl chloride, phosgene or oxalyl chloride are reacted with a salt of the polypeptide amine in the presence of an acid binding agent.

Many of the above compounds are of known therapeutic value, and can be described as vaso-active and also have activity on the central nervous system.

6 Claims, No Drawings

PROCESS FOR PREPARING ERGOT ALKALOIDS

This application is a continuation-in-part of U.S. Pat. application Ser. No. 27,156, filed Apr. 9, 1970 now abandoned. The present invention relates to a new process for the production of a compound of formula I,

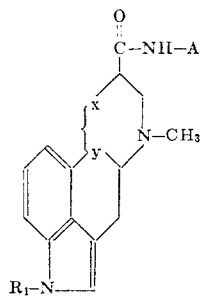

in which $\overline{xy}$ is

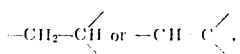

and $R_1$ is hydrogen, lower alkyl, i.e., alkyl having one to four carbon atoms, e.g., methyl, ethyl, isopropyl and the like, allyl or benzyl and —NH—A is a cyclic polypeptide of the ergot alkaloid polypeptide type.

Specific polypeptide radicals are described in respect to some ergot alkaloids in the Examples below. It is to be understood however, that other peptide groups are also contemplated, in particular the polypeptide group contained in ergotamine, ergostine, ergocristine, ergovaline, ergocryptine, ergocornine and ergonine. The polypeptides contemplated normally have the general formula

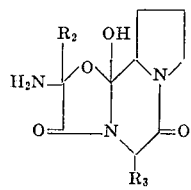

where $R_2$ is hydrogen or lower alkyl as defined above and
$R_3$ is lower alkyl as defined above or benzyl.

The process according to this invention comprises the steps of:

a. forming an amido halide by treating in an inert solvent an N-di(lower) alkyl substituted acid amide of the formula

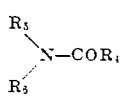

with a halogenating agent selected from the group consisting of thionyl chloride, phosgene and oxalyl chloride where $R_4$ is hydrogen, methyl or ethyl, and
$R_5$ and $R_6$ are each independently lower alkyl having one to three carbon atoms;

b. reacting said amido halide with a lysergic acid compound of the formula:

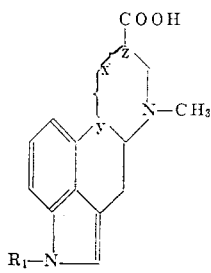

in which $\overline{zxy}$ is

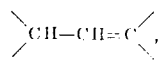

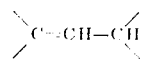

or

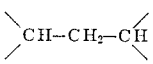

and $R_1$ is as defined above in an inert solvent to form a lysergic acid adduct intermediate and c. reacting said lysergic acid adduct intermediate with a salt of an amine of the formula

where —NH—A is as defined above in an inert solvent and in the presence of an acid binding agent which liberates the base of the amine H—NH—A from its salt.

One preferred method of carrying out the process of the invention consists in that a mixture, consisting of $1-R_1$-lysergic acids, $1-R_1$-isolysergic acids and $1-R_1$-6-methyl $\Delta^{8,9}$-ergolene-8-carboxylic acids, is used as the compound of general formula III. For example, a mixture of lysergic acid, isolysergic acid and 6-methyl-$\Delta^{8,9}$-ergolene-8-carboxylic acid, obtained by saprophytic cultivation of the fungus strain NRRL 3080 of the species Claviceps paspali Stevens et Hall, may be used as compound of general formula III. The compound of general formula II is employed in the form of a salt, since such compounds are normally unstable in free base form. Hydrochloric acid is preferably used as salt-forming acid, although other mineral acids may likewise be used.

The reaction in accordance with the invention involves as an intermediate an amido halide formed by the action of thionyl chloride, phosgene or oxalyl chloride on a N-di(lower) alkyl-substituted acid amide of formula IV. This amido halide is capable of activating the lysergic acid compounds of general formula III by the formation of an adduct. The activation reaction is independent of the sequence of the addition of the reagents; and the intermediate formation of the amido halide and the reactive adduct takes place even if the compounds of general formula III are added in a mixture of an N-di(lower) alkyl-substituted acid amide of formula IV and an inert solvent, and the halogenating agent is subsequently added. The preferred amide of formula IV is dimethyl formamide.

The acid-binding agent, which causes the liberation of the base of general formula II from its salts, may likewise be added to the reaction mixture before or after the addition of a salt of a compound of general formula II. The acid binding agent can be any organic base capable of freeing the amine II from its salts such as triethylamine, pyridine and the like, especially pyridine.

Examples of suitable inert organic solvents for the process of the invention are acetonitrile, chloroform, methylene chloride, an excess of dimethyl formamide, or mixture thereof.

The reaction may be effected at a temperature between −10° and +20°C and the reaction period can range between ½ and 24 hours. After the reaction is complete, the final product is isolated from the reaction solution and purified in manner known per se.

A suitable ratio of the starting materials, i.e. of the amine of formula II and the lysergic acid compounds of formula III, is 1.5 to 2 mols of the lysergic acid compound per mol of the amine in the form of its salts. The molar ratio of halogenating agent to lysergic acid compound is preferably about 1 to about 1.25; and at least 1 mole of N-di(lower) alkyl substituted amide of formula IV per mole of halogenating agent is required to form the amido-halide intermediate, although it is preferred that the reaction be carried out using a molar excess of amide IV.

After the reaction is complete, the reaction mixture is worked up in manner known per se.

An advantage of the process of the invention, as compared with the known reaction of an acid chloride hydrochloride of the lysergic acid series with a salt of the basic peptide portion of ergot alkaloids, in an inert organic solvent and in the presence of an acid-binding agent, consists in that the production and isolation of the chloride hydrochloride of the lysergic acid series are here avoided.

In the case of the production of the acid chloride hydrochlorides of the lysergic acid series it is necessary to use a large excess of pure phosphorous trichloride and phosphorus pentachloride. The destruction of this excess after completion of the reaction is a problem. Furthermore, the acid chloride hydrochlorides of the lysergic acid series can only be handled on a technical scale with difficulty, due to their exteme hygroscopicity and liability to decomposition. In accordance with the process of the present invention such disadvantages are eliminated; furthermore the synthesis of ergot peptide alkaloids is shortened by one stage.

The use of compounds of general formula III in the form of a mixture of lysergic acid, isolysergic acid and 6-methyl-$\Delta^{8,9}$-ergolene-carboxylic acid as starting material, has been found to be specially advantageous. This mixture may be obtained directly by saprophytic cultivation of the fungus strain NRRL 3080 of the species Claviceps paspali Stevens et Hall. The factors indicated above show that the process of the invention permits the production of the pharmacologically highly effective compounds of general formula I, e.g., the alkaloids of the ergotamine and the ergotoxin group, using technically readily obtainable and considerably less expensive starting materials than those hitherto used. This results in a considerably lowering of production costs for the products of the process in accordance with the present invention.

Compounds I are known, and many specific members thereof are of known therapeutic value. In general compounds I can be described as vaso-active and also have activity on the central nervous system. Particulars on the activity and use of compounds of known therapeutic value are available in the literature.

In the following non-limitative Examples all temperatures are indicated in degrees Centigrade and are corrected.

EXAMPLE 1: ERGOTAMINE AND ERGOTAMININE.

A solution of 3.18 g (25 millimols) of oxalyl chloride in 20 cc of absolute acetonitrile is added dropwise during the course of 5 minutes while stirring vigorously to 40 cc of absolute dimethyl formamide cooled to −10° and the resulting crystal mass is stirred at the indicated temperature for 10 minutes. 5.36 g (20 millimols) of an anhydrous mixture of 40 percent 6-methyl-$\Delta^{8,9}$-ergolene-8-carboxylic acid, 40 percent lysergic acid and 20 percent isolysergic acid are subsequently added, and the resulting dark brown suspension is stirred at about −10° for a further 5 minutes. 40 cc of absolute pyridine are then allowed to flow into the mixture while cooling well, at such a rate that the temperature does not exceed −10°. A suspension of 3.68 g (10 millimols) of (2R,5S,10aS,10bS)-2-amino-5-benzyl-3,6-dioxo-10b-hydroxy-2-methyloctahydro-8H-oxazolo[3,2-a]pyrrolo[2,1-c]-pyrazine hydrochloride in 40 cc of absolute dimethyl formamide is then added, and the reaction mixture is stirred for 2 hours at a temperature between −10° and 0°. Working up is effected by diluting with 500 cc of methylene chloride and shaking thoroughly with 200 cc of a 2 N sodium carbonate solution. The aqueous phase is extracted thrice with 300 cc of methylene chloride. After drying the combined organic solutions over sodium sulphate and removing the solvent by distillation in a vacuum, the remaining pyridine is removed by the addition of two 200 cc portions of toluene and subsequent distillation. The residue obtained as light ocher-coloured powder is crystallized from 50 cc of methanol, whereby pure crystalline ergotaminine, having a M.P. of 236°–237° (decomp.), $[\alpha]_D^{20} = +37.5°$ ($c=0.5$ in chloroform), is obtained.

The mother liquor is evaporated to dryness, and ergotamine is crystallized as difficultly soluble sulphate by taking up in a mixture of 40 cc of methanol and 7 cc of glacial acetic acid with the addition of 0.25 g of sulphuric acid in a small amount of methanol. After allowing to stand in a refrigerator for 2 hours, a precipitate of brown, lustrous crystals, having a M.P. of 201°–203°, is obtained; this precipitate is shaken out between 5 percent aqueous ammonia and chloroform, and after drying over sodium sulphate and active charcoal, adding the theoretic amount of d-tartaric acid in methanol and subsequently concentrating by evaporation, directly yields an almost pure white ergotamine tartrate without further purification.

The mother liquor of the ergotamine sulphate crystallization is concentrated by evaporation in a vacuum and worked up to a base as described above. Chromatography on a 30-fold quantity of aluminium oxide, activity I, using methylene chloride as eluant, yields a further amount of pure ergotaminine, and elution with methylene chloride containing 0.5 percent of methanol yields a further amount of ergotamine. Ergotaminine may be rearranged to ergotamine sulphate by dissolving in a twofold quantity of glacial acetic acid and adding the theoretic amount of sulphuric acid in a tenfold quantity of methanol, by simply allowing to stand at room temperature, whereby the yield of pure ergotamine tartrate is correspondingly increased.

EXAMPLE 2: ERGOSTINE.

Ergostine is obtained in accordance with the process described in Example 1, using 3.18 g (25 millimols) of oxalyl chloride, 5.36 g (20 millimols) of an anhydrous mixture of 40 percent 6-methyl-$\Delta^{8,9}$-ergolene-8-carboxylic acid, 40 percent lysergic acid and 20 percent isolysergic acid and 5.56 g (10 millimols) of (2R,-5S,10aS,10bS)-2-amino-2-ethyl-5-benzyl-3,6-dioxo-10b-hydroxy-octahydro-8H-oxazolo[3,2-a]pyrrolo[2,1-c]pyrazine hydrochloride, 2 dioxane.

EXAMPLE 3: ERGOCRISTINE.

Ergocristine is obtained in accordance with the process described in Example 1, using 3.18 g (25 millimols) of oxalyl chloride, 5.36 g (20 millimols) of an anhydrous mixture of 40 percent 6-methyl-$\Delta^{8,9}$-ergolene-8-carboxylic acid, 40 percent lysergic acid and 20 percent isolysergic acid and 4.7 g (10 millimols) of (2R,5S,10aS,10bS)-2-amino-5-benzyl-3,6-dioxo-10b-hydroxy-2-isopropyloctahydro-8H-oxazolo[3,2-a]pyrrolo[2,1-c]pyrazine hydrochloride , dimethyl formamide.

EXAMPLE 4: ERGOVALINE.

Ergovaline is obtained in accordance with the process described in Example 1, using 3.18 g (25 millimols) of oxalyl chloride, 5.36 g (20 millimols) of an anhydrous mixture of 40 percent 6-methyl-$\Delta^{8,9}$-ergolene-8-carboxylic acid, 40 percent lysergic acid and 20 percent isolysergic acid and 3.2 g (10 millimols) of 2-amino-2-methyl-5-isopropyl-10b-hydroxy-3,6-dioxo-octahydro-oxazolo[3,2-a]pyrrola-[2,1-c]pyrazine hydrochloride.

Ergocornine, ergocryptine and ergonine may be produced in a manner analogous to the processes described in Examples 1 to 4.

EXAMPLE 5: ERGOTAMINE AND ERGOTAMININE.

A mixture of 10 cc of absolute dimethyl formamide and 30 cc of absolute methylene chloride is cooled to −10°, and a solution of 2.14 g of thionyl chloride in 10 cc of methylene chloride is added dropwise. 4.02 g of high vacuum dried d-lysergic acid are subsequently added at −10°, and the mixture is stirred at −10° for 5 minutes. 3.68 g of 2-amino-2-methyl-5-benzyl-10b-hydroxy-3,6-dioxo-oxtahydro-oxazolo[3,2-a]pyrrolo[2,1-c]pyrazine hydrochloride are subsequently added, and immediately thereafter 10 cc of absolute pyridine are added dropwise at −10° during the course of 15 minutes while stirring. The reaction mixture is then stirred in the dark, first at 0° for half an hour and subsequently at room temperature for 1½0 hours. Working up is effected by diluting with 500 cc of methylene chloride and extracting this solution with 250 cc of a 4 N aqueous potash solution. The aqueous phase is extracted thrice with 500 cc amounts of methylene chloride, the methylene chloride solution is washed with a dilute common salt solution, dried with sodium sulphate, and the solvent is removed, whereby a brown crude mixture of bases is obtained, which upon crystallization from 40 cc of methanol yields crude ergotaminine having a M.P. of 225°–227° (decomp.). Further crystallization of this crude crystalline product from methylene chrloide/methanol yields pure ergotaminine having a M.P. of 231° (decomp.), $[\alpha]_D^{20}$ = +375° (c = 0.5 in chloroform).

The mother liquor of the crystallization of the ergotaminine crude crystalline product is filtered with suction until dry, is dissolved in a small amount of aqueous acetone, and seeding is effected, whereby ergotamine crystallizes in the form of characteristic crystals. M.P. 172°–175° (decomp.), $[\alpha]_D^{20}$ = −7.7° (c = 1 in pyridine).

EXAMPLE 6: 1-METHYL-ERGOTAMINE AND 1-METHYL-ERGOTAMININE.

5.95 g of thionyl chloride are added dropwise while stirring during the course of 5 minutes to a solution cooled to −10° of 50 cc of absolute dimethyl formamide in 150 cc of absolute methylene chloride, and the mixture is stirred for a further 5 minutes. 14.1 g of 1-methyl-d-lysergic acid are subsequently added at −10°, and the mixture is stirred for a further 5 minutes. 30 cc of absolute pyridine are then added dropwise at −10° with stirring during the course of 5 minutes to the brown-coloured solution immediately followed by 9.2 g of 2-amino-2-methyl-5-benzyl-10b-hydroxy-3,6-dioxo-octachydro-oxazolo[3,2-a]pyrrolo[2,1-c]pyrazine hydrochloride. The reaction mixture is stirred for a further half hour at 0° and then at room temperature for 3 hours. Working up is effected by diluting with 700 cc of ethyl acetate and extracting with 500 cc of a 20 percent potash solution. After extracting the potash solution thrice with 700 cc amounts of ethyl acetate, the ethyl acetate solutions are washed with a common salt solution, dried with sodium sulphate, and the solvent is removed in a vacuum. The residue is chromatographed on 500 g of aluminium oxide, activity I. 1-Methyl-ergotaminine is eluted with methylene chloride containing 0.1 percent of methanol, and after crystallization from methylene chloride/methanol the compound is obtained in pure form. M.P. 219°–220° (decomp.), $[\alpha]_D^{20}$ = +390° (c = 0.5 in pyridine). 1-Methylergotamine is washed from the column with methylene chloride and 0.2 percent of methanol and is purified by crystallization from methylene chloride/methanol. M.P. 167°–170° (decomp). $[\alpha]_D^{20}$ = −163° (c = 0.5 in chloroform).

EXAMPLE 7: 9,10-DIHYDRO-ERGOTAMINE.

10.8 g (40 millimols) of 9,10-dihydrolysergic acid are suspended in 100 cc of absolute dimethyl formamide, and the suspension is cooled to −10°. 4.72 g (40 millimols) of thionyl chloride are then added dropwise during the course of 5 minutes, and the reaction mixture is stirred at a temperature between −5° and 0° for 30 minutes. After the addition of 40 cc of absolute pyridine at −15° while stirring vigorously, 7.36 g (20 millimols) of 2-amino-2-methyl-5-benzyl-10b-hydroxy-3,6-dioxo-octahydro-oxazolo[3,2-a]pyrrolo[2,1-c]-pyrazine hydrochloride are added, and the resulting brick-red coloured slurry is stirred at −5° to 0° for a further 100 minutes, whereby the reaction mixture turns honey-yellow coloured.

Working up is effected by diluting with 500 cc of chloroform, shaking with 300 cc of a 2 N ammonia solution and extracting the aqueous phase thrice with 200 cc of chloroform containing 5 percent of methanol. After washing the combined organic phases with water, drying over sodium sulphate and removing the solvent in a vacuum, a yellow foam is obtained, which after drying in a high vacuum at 100° for 2 hours yields pure, crystalline 9,10-dihydroergotamine from 60 cc of 90 percent aqueous acetone; after drying at 100° in a high vacuum for 2 hours the compound has a M.P. of 235°–239° (decomp.). $[\alpha]_D^{20} = -64°$ ($c = 1$ in pyridine).

EXAMPLE 8: 9,10-DIHYRDO-ERGOCRYPINE.

10.8 g (40 millimols) of 9,10-dihydrolysergic acid are suspended in 100 cc of absolute dimethyl formamide, and the suspension is cooled to −10°. 4.72 g (40 millimols) of thionyl chloride are then added dropwise during the course of 5 minutes, and the reaction mixture is stirred at a temperature between −5° and 0° for a further 30 minutes. After the addition of 40 cc of absolute pyridine at −15° while stirring vigorously, 7.24 g (20 millimols) of 2-amino-2-isopropyl-5-isobutyl-10b-hydroxy-3,6-dioxo-octahydro-oxazOlo[3,2-a]-pyrrolo[2,1-c]pyrazine hydrochloride are added, and the resulting brick-red coloured slurry is stirred at −5° to 0° for a further 100 minutes, whereby the reaction mixture turns honey-yellow coloured.

Working up is effected by diluting with 500 cc of chloroform, shaking with 300 cc of a 2 N ammonia solution and extracting the aqueous phase thrice with 200 cc of chloroform containing 5 percent of methanol. After washing the combined organic phases with water, drying over sodium sulphate and removing the solvent in a vacuum, a yellow foam is obtained, which after drying in a high vacuum at 100° for 2 hours yields pure, crystalline 9,10-dihydro-ergocryptine from 60 cc of ethyl alcohol; after drying at 100° in a high vacuum for 2 hours the compound has a M.P. of 230°-235° (decomp.). $[\alpha]_D^{20} = -41°$ ($c = 1$ in pyridine).

EXAMPLE 9: 9,10-DIHYDRO-ERGOCRISTINE.

10.8 g (40 millimols) of 9,10-dihydrolysergic acid are suspended in 100 cc of absolute dimethyl formamide, and the suspension is cooled to −10°. 4.72 g (40 millimols) of thionyl chloride are then added dropwise during the course of 5 minutes, and the reaction mixture is stirred at a temperature between −5° and 0° for a further 30 minutes. After the addition of 40 cc of absolute pyridine at −15° while stirring vigorously, 7.96 g (20 millimols) of 2-amino-2-isopropyl- 5-benzyl-10b-hydroxy-3,6-dioxo-octahydro-oxazolo[3,2-a]-pyrrolo[2,1-c]pyrazine hydrochloride are added, and the resulting brick-red coloured slurry is stirred at −5° to 0° for a further 100 minutes, whereby the reaction mixture turns honey-yellow coloured.

Working up is effected by diluting with 500 cc of chloroform, shaking with 300 cc of a 2 N ammonia solution and extracting the aqueous phase thrice with 200 cc of chloroform containing 5 percent of methanol. After washing the combined organic phases with water, drying over sodium sulphate and removing the solvent in a vacuum, a yellow foam is obtained, which after drying in a high vacuum at 100° for 2 hours yields pure, crystalline 9,10-dihydro-ergocristine from 60 cc of acetone; after drying in a high vacuum at 100° for 2 hours the compound has a M.P. of 178°-180° (decomp.). $[\alpha]_D^{20} = -64°$ ($c = 1$ in pyridine.

What is claimed is:

1. A process for the production of a compound of formula:

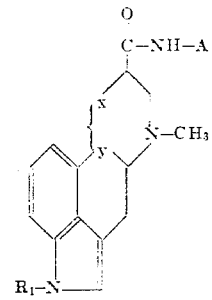

in which $\overline{xy}$ is

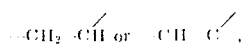

and $R_1$ is hydrogen, lower alkyl, allyl or benzyl and
—NH—A is a cyclic polypeptide of the ergot alkaloid polypeptide type which comprises the steps of:

a. forming an amido halide by treating in an inert solvent an N-di-(lower) alkyl substituted acid amide of the formula

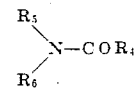

with a halogenating agent selected from the group consisting of thionyl chloride, phosgene, and oxalyl chloride,
where
$R_4$ is hydrogen, methyl or ethyl, and
$R_5$ and $R_6$ each independently represent lower alkyl having one to three carbon atoms;

b. reacting said amido halide with a lysergic acid compound of the formula

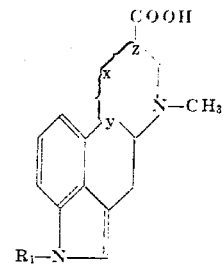

where $\overline{zxy}$ is

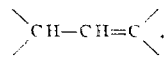

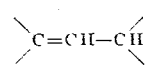

or

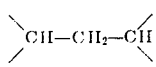

and
R₁ is as defined above in an inert solvent to form a lysergic acid adduct intermediate and
c. reacting said lysergic acid adduct intermediate with a salt of an amine of the formula

H—NH—A where —NH—A is defined above in an inert solvent and in the presence of an acid binding agent which liberates the base of the amine H—NH—A from its salt.

2. A process according to Claim 1, wherein the lysergic acid compound is a mixure consisting of 1-R₁-lysergic acids, 1-R₁-isolysergic acids and 1-R₁-6-methyl- $\Delta^{8,9}$ -ergolene-8-carboxylic acids, where R₁ is as defined in claim 1.

3. A process according to claim 1 in which the N-di-(lower)alkyl-substituted acid amide is dimethyl formamide.

4. A process according to claim 1, wherein the inert organic solvent is acetonitrile, chloroform, methylene chloride or an excess of dimethyl formamide or mixtures thereof.

5. A process according to claim 1, wherein the acid-binding agent is pyridine.

6. A process according to claim 1, wherein the reaction is carried out at a temperature of between —10° and +20°C.

* * * * *